(Model.)  
G. McKAY & H. P. FAIRFIELD.  
Lasting Machine.

No. 231,076. Patented Aug. 10, 1880.

Witnesses  
L. F. Connor.  
Harry Finckel.

Inventors  
Gordon McKay and  
Hadley P. Fairfield.  
by Crosby & Gregory, Attys.

(Model.) 5 Sheets—Sheet 3.
G. McKAY & H. P. FAIRFIELD.
Lasting Machine.

No. 231,076. Patented Aug. 10, 1880.

Witnesses.
W. H. Finckel
Harry Finckel

Inventors.
Gordon McKay
Hadley P. Fairfield
by Crosby & Gregory Attys (Model.) 5 Sheets—Sheet 4.
G. McKAY & H. P. FAIRFIELD.
Lasting Machine.
No. 231,076. Patented Aug. 10, 1880.

Witnesses. Inventors
Wm H Finckel. Gordon McKay and
Harry Finckel. Hadley P Fairfield.
by Crosby & Gregory Attys

(Model.)

G. McKAY & H. P. FAIRFIELD.
Lasting Machine.

No. 231,076.   Patented Aug. 10, 1880.

Witnesses.
A. E. C. Whitney
L. F. Connor

Inventors.
Gordon McKay and
Hadley P. Fairfield.
by Crosby Gregory Attys

UNITED STATES PATENT OFFICE.

GORDON McKAY, OF CAMBRIDGE, AND HADLEY P. FAIRFIELD, OF WEST MEDFORD, MASSACHUSETTS.

LASTING-MACHINE.

SPECIFICATION forming part of Letters Patent No. 231,076, dated August 10, 1880.

Application filed April 14, 1880. (Model.)

*To all whom it may concern:*

Be it known that we, GORDON MCKAY, of Cambridge, and HADLEY P. FAIRFIELD, of West Medford, county of Middlesex, State of Massachusetts, have invented an Improvement in Lasting-Machines, of which the following description, in connection with the accompanying drawings, is a specification.

This invention relates to improvements in lasting-machines of that class wherein pinchers are employed to hold the edges of. the upper while it is being stretched over or drawn close upon the last.

The pinchers, as herein shown, are pivoted upon a spring-held suspension-rod, the said springs acting to elevate the pinchers when released, they being released automatically just after the shank and toe-pads come into position against the shoe.

The last is pressed vertically into the upper by downholds made adjustable vertically with relation to the bottom of the last at heel and toe and longitudinally with relation to the length of the last, this latter adjustment being made by a right-and-left-hand screw of such pitch that a certain definite movement or turn of the screw through uniform distances will make the proper horizontal adjustment for each successive size of shoe. This hold-down also preferably carries a toe-notching device to notch or cut the toe of the upper previously secured by a lasting-tack, as in hand-lasting, the said notching device removing portions of the surplus material at the edge of the upper, near the central part of the toe of the last, preparatory to the operation of the toe-crimping jaws.

The auxiliary cutters are preferably thrown forward by hand to shave off or cut away the tops or elevated parts of the plaits or crimps at the edges of the upper formed in advance of the notched acting-edges of the crimping-jaws. These auxiliary cutters are preferably notched, and the projecting points between and at the sides of the said notches are blunt to avoid cutting the edges of the upper.

The pinchers and hold-down mechanism are carried by a movable head which is held locked in position over the center of the last during the time that the pinchers engage the upper, and the hold-down mechanism acts against the inner sole upon the last.

Just as the last and side-lasting devices are brought into the proper relative position for the side-lasting devices to turn the edges of the upper at the sides of the last over upon the inner sole, the shank and toe-pads are closed upon the upper at the sides of the last, and the side-lasting devices then complete their closing-in movement, and actuate the toe and heel-crimping jaws.

As soon as the shank and toe-pads come into their bearing position upon the upper and the end of the side-lasting fingers project a little way over the edges of the inner sole the pinchers are automatically opened, the presser is unlocked and retracted, and the head is automatically unlocked and moved, so as to remove the pinchers and hold-down mechanism from above the last, to permit unobstructed access to the shoe while being nailed.

We have devised two shafts, one to operate the hold-downs and the other the side-lasting devices. Each of the said shafts has fixed upon it a drum that acts frictionally upon a belt connected at one end with an arm of the rocker-shaft, to which power is applied by the hand or foot when it is desired that the hold-down or side-lasting devices operate. The opposite end of one of these straps is connected in one instance with one arm of a toggle-lever attached to the hold-down mechanism, and the end of the other strap is connected with a lever that actuates the wedges or cams which close the side-lasting jaw-carriers. Power being applied by hand, as described, to move the said belts in the proper direction brings their inner surfaces in close contact with the surfaces of these drums moving in the same direction, causing them to apply to the belts power in addition to that exerted by the hand or foot commensurate with the degree of friction between the said belts and drums.

Fig. 12, a detail showing the toe-crimping jaws and cutters above them drawn back, the said figure also showing part of the toe of the shoe to be lasted, the toe of the upper being held by the single lasting-tack. Fig. 13, a detail top view of the toe-pads, with side wedges and levers to move them; Fig. 14, a side elevation of the toe-carriage, toe-pad, and lever to move it, as the said parts would appear were the side-lasting jaw-carrier in Fig. 1 removed; Fig. 15, a sectional detail on the line $y$, Fig. 1. Fig. 16 shows the toe of the shoe after it is notched by the notching-cutter carried by the downhold. Fig. 17 is a detail showing the shank-pads in operative position upon the last; Fig. 18, details of the slide 2 that carries the pivot of the toe-lasting jaws. Fig. 19 is a detail of the notched block $e^2$ on the hand-lever $d^2$ and its spring $f^2$. Fig. 20 is a detached detail of the upper part, $p'$, of the toggle-lever and its connected piece $r^2$; Fig. 21, a top view of the locking device for the movable head. Figs. 22, 23, and 24 are details, showing means by which to control automatically the extent of inward movement of the shank-pads according to the size of the last, we in practice preferring to employ the devices therein shown rather than those shown in the other figures.

The frame-work A of the machine, of proper shape to sustain the working parts, has bearings for the main driven shaft B, upon which is a friction-drum, C, about which is extended the strap D, one end of which is connected with an adjustable stud, E, of the foot-lever F, pivoted at G, while the other end of the said strap is connected with the upper end of a lever, H, having its fulcrum on the said pivot G.

The lever H at its lower end is connected by link I with and moves the rod J, provided with two wedges, K L.

The wedge K acts upon the rolls at the lower ends of the carriers M, pivoted at N, upon which are mounted the forms, to which are secured the side-lasting devices, herein shown as steel fingers $a$, but which are not herein claimed, broadly, as they will form the subject-matter of another application.

The wedge L strikes between the rolls at the lower ends of the pivoted levers $b$, having connected with their upper ends short spring-arms R, upon which are mounted by a suitable universal joint the shank-pads $c$.

The wedge L, when moved, closes the pads $c$ quickly upon the upper, and then, by a further movement of the rod J, the wedge K closes the carriers M more slowly.

Each of these carriers in practice will have at each end an incline, $p$, that, as the carriers are closed at their upper ends to cause the side-lasting devices $a$ to crowd the upper over upon the inner sole, strike the rolls $d$ on the levers $e$, pivoted at $j$ on the toe-carriage S, the said levers being connected by links $f$ with the toe-jaws $g$, pivoted at $h$ on the slide 2, guided on the top plate, $k$, of the said carriage, and cause the said levers and links to close the toe-jaws sufficiently to crimp the toe of the upper over upon the inner sole, the said toe-jaws moving forward as they are being closed. This forward movement is produced by the links $i$ (see Fig. 8) attached to the said levers $e$, the said links at their other ends being connected with a part of the slide 2, so as to move the said slide and the pivot $h$ of the toe-jaws forward.

The toe-pads $l$ are pivoted at $m$ on the toe-carriage S, (see Fig. 6,) made adjustable by the screw $n$ toward and from the shank of the last and the levers $b$, that carry the shank-pads $c$ and toe-pad-closing arms or projections $r$.

The screw $n$, which turns but does not slide, is provided with right and left threaded portions, to engage and move simultaneously in opposite directions and at different or at the same speed both the toe and heel jaw carriages, the latter being, as previously stated, omitted from the drawings.

Between the levers $b$, (see Figs. 4, 5, 6,) and secured to the rigid or fixed frame-work, is a wedge-block, $o'$, along the inclined sides of which the lower ends of the pivoted toe-pads travel as the toe-carriage is adjusted horizontally, the wedge-block acting to determine the extent to which the said jaws may open in any adjusted position of the carriage S, the extent of this opening of the jaws depending upon the size of the shoe being lasted.

The toe-pads at their sides (see Figs. 12 and 13) have inclines $o$, which, as the levers $b$ are closed to bring the shank-pads against the last, are struck by the ends of the toe-pad-closing arms $r$, which then act to close the toe-pads upon the upper at the toe of the last.

By employing the said inclines $o$ it is possible to close the toe-pads more or less, according to the size of the shoe being lasted, and the said inclines, being fixed upon the toe-pads, act automatically as the toe-carriage is moved or adjusted horizontally, to insure a proper amount of closing movement for the toe-pads, according to the size of the last.

Figures 5, 6, 7, 8:
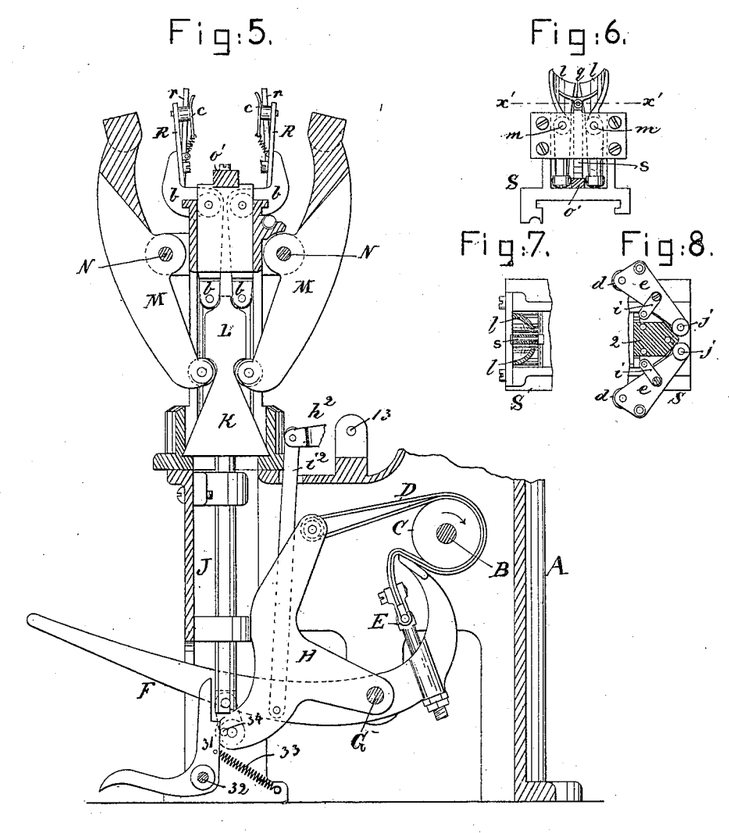
Fig. 5 is a vertical cross-section, showing part of the machine from the top of the lasting-jaw carriers down, the line of section being about on the line $x\ x$, Fig. 4.
Figs. 6, 7, and 8 are details of the toe-lasting mechanism and actuating parts.

The toe-rest $q$ is a cup-shaped piece mounted to rock or turn on a pivot at the top of the toe-rest-carrying bar $s$, (see Fig. 6,) fitted loosely in ways made for it in the toe-rest carriage S, as shown in Fig. 7, which is a partial horizontal section of the said carriage on the line $x'\ x'$, Fig. 6. The lower end of this bar $s$ rests upon the upper side of the said wedge-bar $o'$, and as the carriage is moved horizontally the said toe-rest is automatically raised and lowered to accommodate it in position to the size of the shoe being lasted.

The inner or working edges of the jaws $g$ (see Fig. 12) are cut away at $t$ to cause the crimps at the toe of the upper to form directly opposite the said notches. In line with these notches we have placed the auxiliary cutters $u$, notched at their front ends and provided with cutting-edges at the said notches, opposite the cut-away parts $t$ of the toe-jaws, so that as the auxiliary cutters are subsequently moved forward independent of the jaws their notched parts will pass beyond the acting-edges of the jaws $g$ and cut away the crimped or wrinkled or bunched-up parts of the upper.

Figure 4:
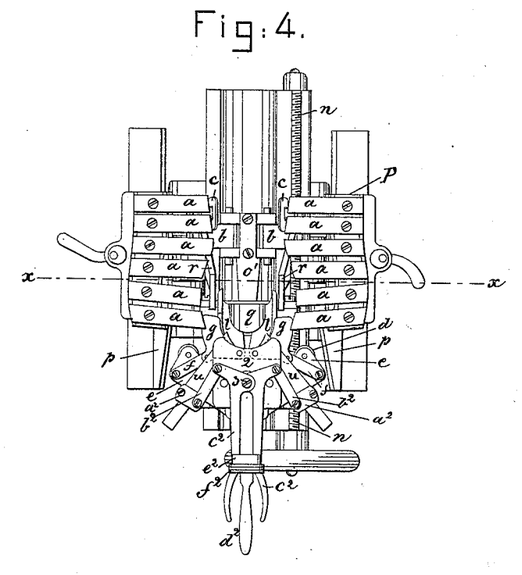
Fig. 4 is a detail top or plan view, showing the side and toe lasting devices, the cutters, and the toe and shank pads, the heel-lasting jaws and their accessories being omitted, as they in practice will be substantially like the toe-lasting jaws.

The portions $w$ (see Fig. 12) of the cutters are made dull, so as not to act injuriously against the upper or any part of it. These cutters are fitted into grooves in the slide 2, so as to be moved diagonally therein, as shown in Fig. 4. The shank of each cutter $u$ is adjustably held in the clamp $a^2$, connected by link $b^2$ with one of the hand-levers $c^2$, pivoted at 3. The pivot 3 also serves as the fulcrum of a hand-lever, $d^2$, provided with an attached block, $e^2$, (see Fig. 19,) grooved at its sides to receive the levers $c^2$, a spring, $f^2$, about the said levers $c^2\ d^2$ and block, serving to keep the said levers $c^2$ in contact with the lever $d^2$.

The lever $d^2$ (see Fig. 4) may be moved toward the right or left, as desired, and turn one of the levers with it in the direction of its movement, and throw its attached cutter $u$ forward to cut away the wrinkled or plaited part of the shoe-upper, the other lever, $c^2$, at that time remaining stationary. The lever $d^2$, being moved in one and then in the other direction, operates first one and then the other cutter at the proper times.

The lasts for right and left shoes differ in shape at their sides near the shank, and were it not for supporting the shank-pads upon the universal joints, it would be impracticable to last both rights and lefts, because of unequal pressure of the said pads, except by adjusting the pads when changing from right to left, and vice versa.

In Fig. 17 we have shown a last in cross-section at the shank, looking toward the toe. The full outline of said figure represents the outline of a right-foot last and the dotted outline that of a left-foot last. These right and left foot lasts have a common point, $f^2$, on the horizontal dotted line therein shown, and it is substantially at this common point that we locate the center of motion of the shank-pads, and we are thereby enabled to cause the said pads to always properly meet and co-operate with the upper upon either a right or left foot last. The arms in which these shank-pads are carried are moved out and in to adapt them to the width of the last, and may be adjusted horizontally to bring them at the proper position to meet the sides of the last at the shank.

We are aware that the upper ends of spring-arms supported below the last, as described in Reissued United States Patent No. 8,627, have been made to bear upon the upper at the shank of the last as the side-lasting jaws or devices are closed; but such shank-springs are not pivoted at and in the line indicated in Fig. 17—viz., the coinciding line of right and left foot lasts—as described, and cannot readily and properly adapt themselves with equal and uniform pressure to right and left foot lasts, and do work equally as good with each, as is the case with the small independent shank-pads universally pivoted, as described.

The shaft B has upon it a pulley, T, that is connected, as herein shown, by cross-belt V, with the pulley W on the shaft $a'$ in a short bearing, $b'$. The shaft $a'$ has a bevel-gear, $c'$, that engages a bevel-gear, $d'$, and drives a bevel-gear, $e'$, on a shaft, $f'$, having upon it a drum, $g'$. The shaft $f'$ has its bearings attached to the head $A^2$, herein shown as pivoted between the ears $h'\ i'$ (see Fig. 2) of the frame A. In this form of our invention the said head is adapted to be moved or vibrated horizontally in the arc of a circle.

Figure 2:
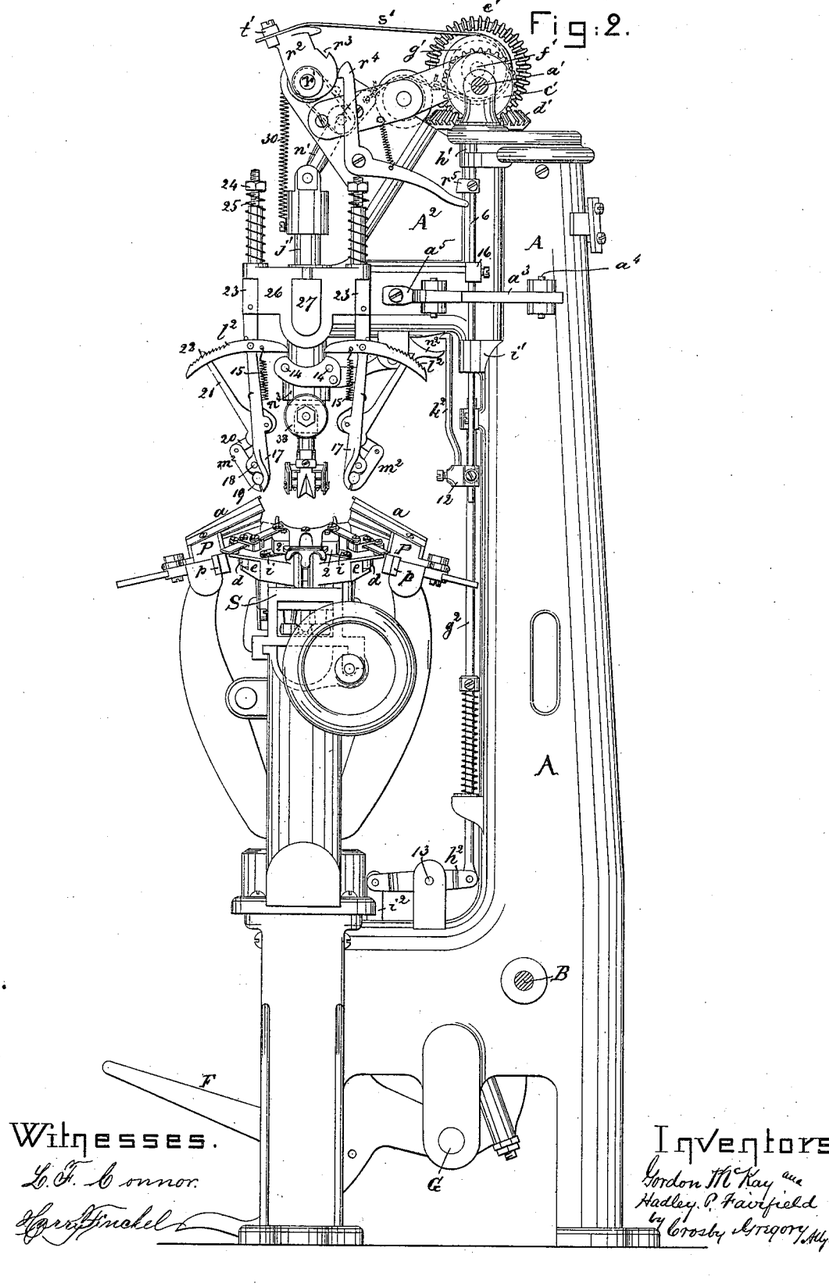
Fig. 2, a right-hand end elevation, the movable head being in proper position for the pinchers to be closed upon and to hold the edges of the upper, the shoe-upper and last being omitted to avoid confusion. In said figure the springs of the pinchers hold them up in a position above that which they would occupy if the pinchers, closed as therein shown, engaged the upper.
Figure 3:
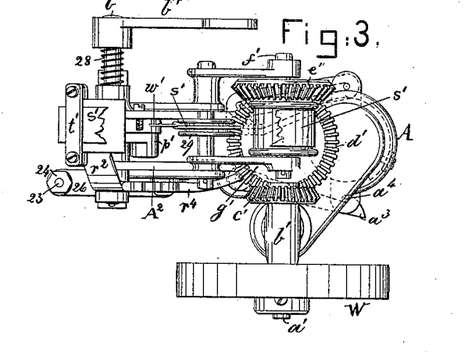
Fig. 3 is a view of only the top of the machine, that part of the strap (see Fig. 2) extending between the friction-drum and toggle-lever being broken out to show the moving parts below it.

The head $A^2$ carries a rod, $j'$, having at its lower end a tubular cross-head, $k'$, to which are adjustably secured the rear and fore part downholds $l'\ m'$. The upper end of rod $j'$ is connected with one member, $n'$, of a toggle-lever, the other member, $p'$, of which is arranged to turn on a pivot or center, $r'$. This upper member (shown separately in Fig. 20) has a projecting arm, $r^2$, provided (see Fig. 2) with a ratchet-tooth, $r^3$, adapted to be engaged by the hold-down locking device, (shown as a pawl, $r^4$,) preventing the hold-down rod $j'$ from rising when lowered until at such proper time as the said pawl $r^4$ shall be acted upon by the ear $r^5$ on the rod 6, guided at its upper end in the lug $h'$, and connected at its lower end with the block 12, attached to the rod $g^2$, connected with lever $h^2$, pivoted at 13, the said lever being joined by link $i^2$ with the foot-lever F. This block 12 has connected with it a hooked rod, $k^2$, that, as the foot-lever is depressed to close the side-lasting devices over upon the inner sole, meets the end of the tripping device that disengages the locking device $l^2$ of the pinchers $m^2$, and permits them to open and release the edges of the upper held between the two members of the said pinchers. In Fig. 2 the said pinchers are shown as closed or shut as they will be when engaging the upper. This tripping device is composed of a lever, $n^2$, connected with a movable collar, $n^3$, having projecting pins 14, that strike the short ends of the locking devices $l^2$ and turn them in opposition to their connected springs 15.

Figure 1:
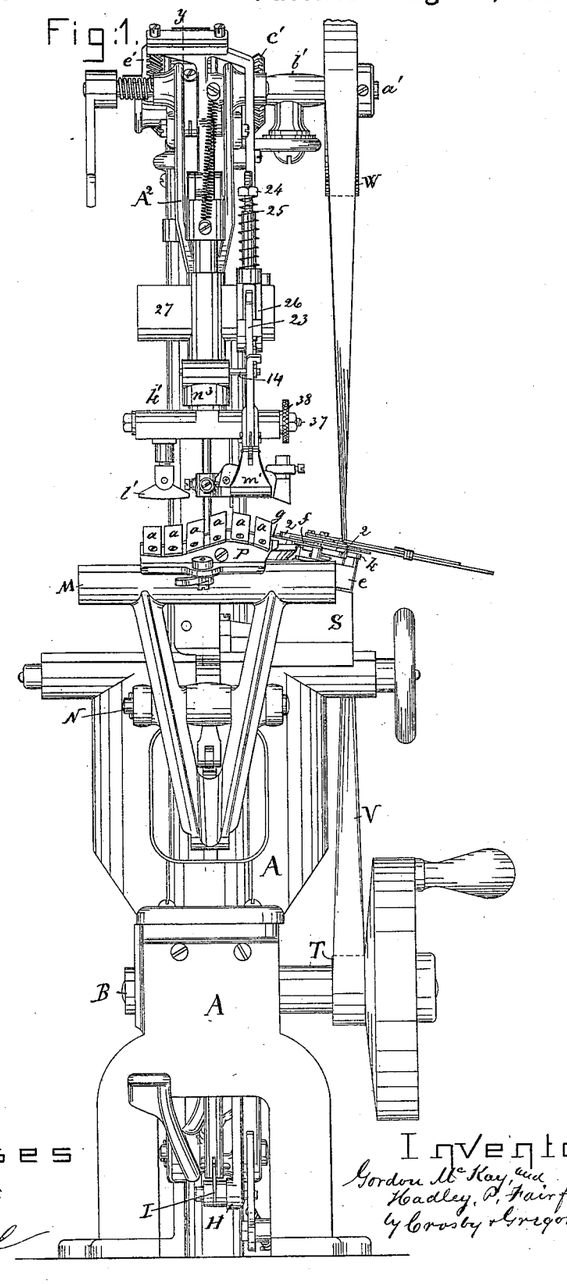
Figure 1 represents, in front elevation, a lasting-machine provided with our improvements.

The head $A^2$ has a head-locking device, $a^3$, (see Fig. 2 and detail Fig. 21,) made as a hook to clutch over a pin, $a^4$, a spring, $a^5$, keeping the said locking device engaged and holding the head in proper position above the last-bottom and shoe, as in Figs. 1 and 2, except when it is desired to move the said head out of the way to nail the upper and sole together, at which time the lug 16 on the rod $g^2$ strikes and disengages the locking device $a^3$, leaving the head free to be moved or turned aside from above the shoe and last.

Each pincher is composed of a main jaw, 17, upon which, at 18, is pivoted the second jaw, 19, its upper end being connected by link 20 with the lower end of the elbow-lever 21, having a laterally-projecting finger, 22, at its upper end to engage the teeth of the locking device $l^2$.

Each main jaw 17 is pivoted upon a guided rod, 23, having a nut, 24, acted upon by a spiral spring, 25, the tendency of which is to lift the said rod and pinchers as soon as the pinchers are released from the upper.

The rods 23 are guided in box 26, made horizontally adjustable upon the cross-head 27, connected with head $A^2$.

The strap $s'$ is attached at one end by the plate $t'$ with the member $p'$ of the toggle-lever, and passed about the drum $g'$. Its other end is attached to the arm $w'$ of the rocker-shaft $b^3$, having connected with it a hand-lever, $b^4$, by which power is applied to the said shaft when it is desired to draw the said strap and straighten the toggle-lever to depress the downholds and force the last to the proper level with relation to the side-lasting devices. The torsional spring 28 on the shaft $b^3$ acts to turn it to slacken the strap $s'$. The strap $s'$ passes also over a sheave, 29.

The drums $g'$ C are always in rotation, and as soon as the operator moves the foot-lever F or the hand-lever $b^4$ to draw taut the straps $s'$ and D they are, by the application of power in this way, moved in the proper direction, and are at the same time drawn closely about or in contact with the surfaces of the said moving drums, which increase the power of the said straps to operate their connected levers to a greater or less amount, according to the amount of friction between the said straps and drums. The toggle-lever once straightened, as it will be as the hold-downs reach their lowest position, the pawl $r^4$ (before described) will lock the hold-downs in place until released, as hereinbefore described, and the pawl released, the downholds will be quickly retracted by the spring 30. The rod J, Fig. 5, having been lifted, the rod-arresting device 31 (shown as a lever pivoted at 32 and acted upon by the spring 33) is thrown inward at its upper end until its notch is placed in range with a pin, 34, on the lever H. The rod J, as long as the foot is on treadle-lever F and the lever is fully down, keeps the lasting devices closed upon the upper and last until the nailing is effected, when, to inspect the work, it may be desirable to open the lasting devices without releasing the shank and toe pads from the upper. To do this the lever F may be permitted to rise until the rod J descends far enough for the pin 34 to strike the notched part of the lever 31, when, if the work is satisfactorily performed, the rod-arresting device may be turned outward to permit the rod to fully descend.

Figure 9:
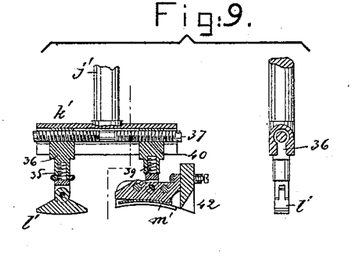
Fig. 9, a detail, partially in longitudinal and vertical section, of the hold-down, to show its means for vertical and horizontal adjustment.
Figure 10:
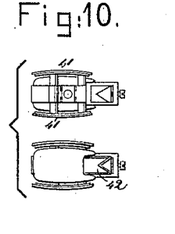
Fig. 10, details showing a top and under-side view of the forward part of the hold-down and its attached notching-cutter.
Figure 11:
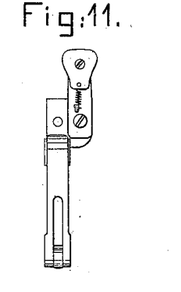
Fig. 11, a detail showing face views of one of the shank-pads.

The rear-part downhold $l'$ is pivoted upon a screw-rod, 35, which enters a nut, 36, fitted in a guideway (see Fig. 9) made in the hollow cross-head $k'$, and made to engage one part of the right-and-left-handed screw 37, which has a milled nut, 38, (see Figs. 1 and 2,) by which the said screw can be turned one or more turns; but the said screw does not move longitudinally.

The fore-part downhold $m'$ is composed of a concaved plate attached to a screw-rod, 39, and nut 40, fitted in a like manner into the hollow cross-head $k'$ and to the said screw 37. At the sides of the fore-part downhold are pieces of leather or india-rubber 41, that act upon the edges of the inner sole to keep it down upon the last, but yet so as to yield if struck by the side-lasting devices.

The screws 35 39 permit vertical adjustment of the downholds, and the screw 37 regulates their distance apart for different sizes of shoes. In practice one turn of the screw 37 makes the adjustment from a shoe of one to a shoe of the next size.

The notching-cutter 42, adjustably attached to the fore-part downhold, notches or cuts out the edge of the upper at the toe of the last each side of the toe-lasting tack 43, (see Fig. 16,) leaving the notches therein shown to permit the upper to be crimped in smoothly at the toe of the shoe while closing the toe-jaw fully over the toe of the inner sole on the last. As the toe-jaws are closed in, other parts of the edge of the upper are bunched up at the sides of the said notches; but such bunched-up edges are subsequently cut away by the auxiliary cutters, as described.

The heel of the last will be supported upon a last-pin, as shown in the Glidden patents.

In Fig. 22, $c^3$ is supposed to represent a section of the last.

The shank-pads $c$ are universally jointed to a radius-bar, $c^4$, pivoted at $c^5$ to a rigid part of the frame.

The lever $b$ is substantially like that shown in Fig. 5, except as to its upward extension and the position of its pivot. The upper arm of the lever $b$ has an adjusting-screw, $c^6$, which is set to give the proper pressure upon the radius-bar $c^4$, but which, when once set, need not be thereafter adjusted to last a shoe of a different size.

Between the inner end of said screw and the outer face of the radius-bar $c^4$ is interposed a wedge-bar, $c^7$, pivoted to a part of the toe or heel carriage, so that as the said carriage is adjusted horizontally, as before described, to adapt the apparatus to shoes of different sizes, the said wedges will be simultaneously moved between the said screw and the radius-bar to insure the proper extent of movement of the shank-pad for the sized shoe being operated upon. We denominate the wedge-bar $c^7$ as the "shank-pad-adjusting device."

We do not broadly claim fore and rear part downholds, nor suspended pinchers to engage the edges of the upper while the upper is being fitted to the last; nor do we broadly claim cutting away the bunched-up portions of the edge of the upper when on the last.

We claim—

1. In a lasting-machine, a series of independent overhanging pinchers to grasp the upper at its edges, combined with fore and rear part downholds to act upon the inner sole while the upper is being drawn or fitted to the last, and with independently-operated side and toe lasting devices to crowd the edges of the upper over upon the inner sole upon the last, substantially as described.

2. The pinchers and their carrying-rods, combined with the springs to lift the rods and pinchers when released from the upper, substantially as described.

3. The pinchers pivoted upon spring-supported rods, combined with the vertically-movable fore and rear part downholds, as described.

4. The suspended pinchers and their locking devices to hold the jaws of the pinchers closed upon the upper, combined with the tripper to automatically move the pincher-locking devices to release the jaws of the pinchers just after the side-lasting devices impinge against the upper upon the last.

5. In a lasting-machine, the movable head, combined with and carrying the pinchers and fore and rear part downholds, substantially as described.

6. In a lasting-machine, the horizontally-movable head, and the downhold mechanism and pinchers connected therewith, and the head-locking device, and means, substantially as described, to automatically release the said head to permit it to be moved horizontally away from over the lasted shoe, substantially as described.

7. The head and its attached pinchers, and the rod $j'$ and its attached downholds, combined with the toggle-lever, the said lever crowding the last into the upper in opposition to the pull of the pinchers, and with locking devices to hold the toggle-lever while the downhold is depressed upon the inner sole, substantially as described.

8. The rod $j'$ of the downhold mechanism and its cross-bar provided with the right-and-left-hand screw, combined with the nuts and attached fore and rear part downholds, substantially as described.

9. The downhold, combined with the toe-notching cutter carried by it.

10. The fore-part downhold, combined with the flexible or elastic surfaces to press upon the inner sole near its edges, substantially as described.

11. The vertically-movable fore and rear part downholds and attached notching-cutter, combined with the suspended pinchers to engage and hold the upper as the fore and rear part downholds act upon the inner sole, substantially as described.

12. The friction-drum $g'$, combined with the strap connected with the downhold mechanism, and with means, substantially as described, to tighten the said strap upon the drum to operate the downhold mechanism, substantially as described.

13. The fore and rear part downholds, their connected nuts, and the right-and-left-hand screw to move them and adjust the downholds longitudinally, as described.

14. The carriage S and the pivoted independent toe-pads having downwardly-extended arms, combined with a cam or projection to operate upon the arms of and close the said toe-pads to grasp the upper, as set forth, against the sides of the last at its toe, substantially as described.

15. The carriage S and pivoted independent toe-pads, combined with the toe-rest and means, substantially as described, to automatically raise and lower the toe-rest as the carriage is adjusted horizontally.

16. The carriage S and pivoted toe-pads provided with inclines $o$, combined with the closing-arms, substantially as described.

17. In a lasting-machine, the following instrumentalities, viz: side-lasting jaws or devices to operate upon the upper and lay it over upon the inner sole, shank-pads pivoted below the line of action of the side-lasting devices and upon independent arms, the pivots of the shank-pads being located on the line hereinbefore described with relation to the bottom of the last, to enable the said shank-pads to readily adapt themselves to a right or left foot last, and two toe-pads, one to operate upon the upper, at each side of the last, near the toe, substantially and for the purpose described.

18. In a lasting-machine, the notching-cutter 42, secured to the downholds, to first remove some of the edge of the upper at the toe of the shoe, as described, combined with the crimping-jaws and auxiliary cutters, to operate as set forth.

19. In a lasting-machine, crimping-jaws mounted upon a horizontally-movable carriage, and arms or levers $e$ on the said carriage, and links $i$ to connect them with the toe-jaws $g$, combined with the side-lasting carriers having inclined faces $p$, substantially as described, to automatically move the said levers and jaws different distances, according to the adjustment horizontally of said carriage, to adapt the movement of the same jaws to shoes of different sizes.

20. The pivoted shank-pad-carrying levers or arms, combined with the shank-pads $c$, mounted thereon near their upper ends, and pivoted, as set forth, to rock, as described, substantially in that line or point below but near the bottom of the last common to the surface of both the right and left foot lasts, at or near their shanks, to thus adapt the shank-pads to both right and left foot lasts, as set forth.

21. The universally-pivoted shank-pads and their actuating levers or arms, combined with intermediate mechanism, substantially as described, to vary the extent of movement of the shank-pads according to the size of the last.

22. The drum C and strap extended about it, connected at one end with the mechanism for operating the side-lasting devices, combined and connected at its other end with the foot-lever, to strain the said strap against the said drum, substantially as and for the purpose described.

23. The side-lasting devices and the universally-pivoted shank-pads $c$ and the independently-movable toe pads $l$, combined with mechanism, substantially as described, to automatically close the shank and toe pads upon the upper on the last, and then the side-lasting devices, as and for the purpose hereinbefore described.

24. The side-lasting devices, independent arms R, and universally-pivoted shank-pads $c$, pivoted thereon below the level of the line of closing-in movement of the said side-lasting devices, combined with means, substantially as described, to first act upon and close the shank-pads against the upper on the last, and then to separately actuate the side-lasting devices, whereby they may be closed upon the last and partially withdrawn, if desired, without releasing the shank-pads, as and for the purposes set forth.

25. The side-lasting devices, made movable to last the sides of the shoe independently of the shank-pads, combined with the shank-pads $c$, pivoted upon carrying-arms, automatically moved independently of the side-lasting devices and at different times, or in the order or succession herein stated, and with independent toe-pads, one for each side of the last at the toe, the said toe-pads being automatically operated simultaneously and in unison with the shank-pads, as and for the purpose set forth.

26. In a lasting-machine, the suspended pinchers and downhold mechanism and the movable head to carry them, combined with means, substantially such as described, to automatically release the pinchers, release the downhold mechanism to permit the downholds to be retracted, and to unlock the movable head to permit it to be moved away from above the lasted shoe in the order described.

In testimony whereof we have signed our names to this specification in the presence of two subscribing witnesses.

GORDON McKAY.
HADLEY P. FAIRFIELD.

Witnesses for Gordon McKay:
J. H. APPLEGATE,
FRANK F. STANLEY.

Witnesses for Hadley P. Fairfield:
G. W. GREGORY,
N. E. C. WHITNEY.